United States Patent
Andersen et al.

(10) Patent No.: US 11,204,017 B2
(45) Date of Patent: Dec. 21, 2021

(54) PROTECTION OF A BRAKE IN A WIND TURBINE

(71) Applicant: VESTAS WIND SYSTEMS A/S, Aarhus N (DK)

(72) Inventors: Lars Rohrmann Andersen, Hadsten (DK); Peter Gjellerup Schiønning, Randers SV (DK); David Steele, Skanderborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 2 days.

(21) Appl. No.: 16/627,444

(22) PCT Filed: Jun. 21, 2018

(86) PCT No.: PCT/DK2018/050159
§ 371 (c)(1),
(2) Date: Dec. 30, 2019

(87) PCT Pub. No.: WO2019/001668
PCT Pub. Date: Jan. 3, 2019

(65) Prior Publication Data
US 2021/0180564 A1 Jun. 17, 2021

(30) Foreign Application Priority Data
Jun. 30, 2017 (DK) .......................... PA 2017 70536

(51) Int. Cl.
*F03D 9/00* (2016.01)
*H02P 9/04* (2006.01)
*F03D 7/02* (2006.01)

(52) U.S. Cl.
CPC ......... *F03D 7/0224* (2013.01); *F03D 7/0264* (2013.01); *F05B 2260/90* (2013.01); *F05B 2270/107* (2013.01); *F05B 2270/1033* (2013.01)

(58) Field of Classification Search
CPC . F03D 7/0224; F03D 7/0264; F05B 2270/107
See application file for complete search history.

(56) References Cited

U.S. PATENT DOCUMENTS 8,169,097 B2 * 5/2012 Weitkamp ............... F03D 80/50
290/44
10,578,081 B2 * 3/2020 Theopold .................. F03D 7/04
(Continued)

FOREIGN PATENT DOCUMENTS

| CN | 101490411 A | 7/2009 |
| CN | 102748213 A | 10/2012 |

(Continued)

OTHER PUBLICATIONS

Chinese Office Action for Application No. 201880042547.4 dated Aug. 13, 2020.
(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

Embodiments herein describe validating an emergency stop signal before activating a brake within a wind turbine. The emergency stop signal is received from a control node of a plurality of control nodes distributed throughout the wind turbine, and the emergency stop signal indicates that the wind turbine should be shut down. The wind turbine is shut down by transmitting a shutdown signal to the plurality of control nodes. Upon determining there is no indication a (Continued)

person is present within the wind turbine, the emergency stop signal is validated. Additionally, upon determining the emergency stop signal is valid, a brake within the wind turbine is activated to bring the rotor to a stop.

18 Claims, 6 Drawing Sheets

(56) References Cited

U.S. PATENT DOCUMENTS

| | | | |
|---|---|---|---|
| 2009/0224543 A1 | 9/2009 | Steudel et al. | |
| 2010/0013227 A1* | 1/2010 | Weitkamp | F03D 17/00 |
| | | | 290/44 |
| 2011/0238358 A1* | 9/2011 | Block | F01K 13/003 |
| | | | 702/113 |
| 2014/0246857 A1 | 9/2014 | Giertz et al. | |
| 2015/0008673 A1 | 1/2015 | Damen | |
| 2015/0042293 A1* | 2/2015 | Hehenberger | F03D 7/0248 |
| | | | 322/21 |
| 2015/0337806 A1* | 11/2015 | Damgaard | F03D 1/00 |
| | | | 700/287 |
| 2015/0370225 A1* | 12/2015 | McCune | G05B 9/02 |
| | | | 700/293 |
| 2017/0175708 A1* | 6/2017 | Roesmann | F03D 7/04 |
| 2017/0226989 A1 | 8/2017 | Hammerum et al. | |
| 2017/0248124 A1 | 8/2017 | Hammerum et al. | |
| 2017/0321653 A1* | 11/2017 | Rebsdorf | B63B 39/005 |
| 2018/0039234 A1* | 2/2018 | McCune | G05B 9/02 |
| 2018/0372070 A1* | 12/2018 | Vital Amuchastegui | |
| | | | G05B 17/02 |

FOREIGN PATENT DOCUMENTS

| | | |
|---|---|---|
| CN | 104053903 A | 9/2014 |
| EP | 2725222 A2 | 4/2014 |
| WO | 2013097867 A2 | 7/2013 |
| WO | 2016023561 A1 | 2/2016 |
| WO | 2019001668 A1 | 1/2019 |

OTHER PUBLICATIONS

PCT International Search Report for PCT/DK2018/050159 dated Sep. 25, 2018.
Danish Patent and Trademark Office 1st Technical Examination for PA 2017 70536 dated Jan. 15, 2018.
PCT Written Opinion of the International Searching Authority for PCT/DK2018/050159.

* cited by examiner

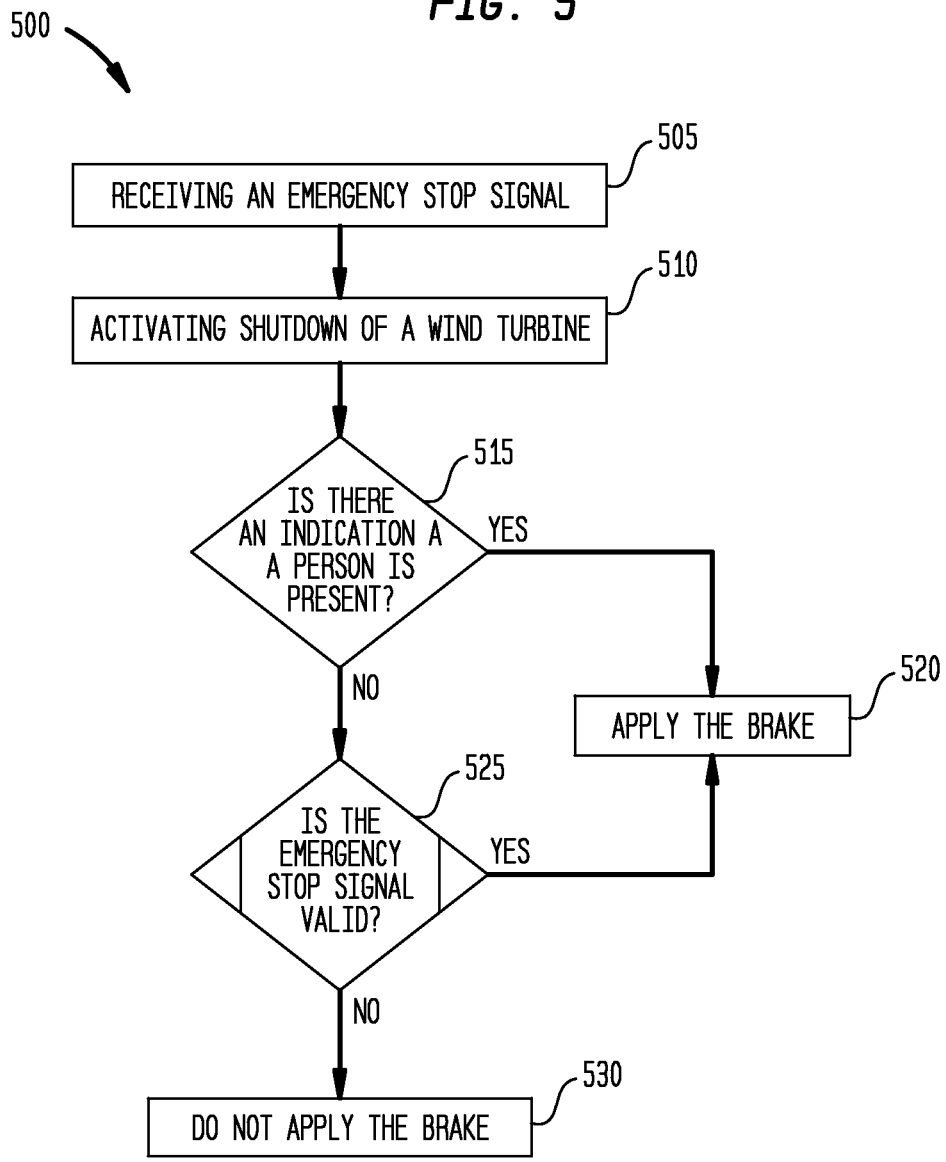

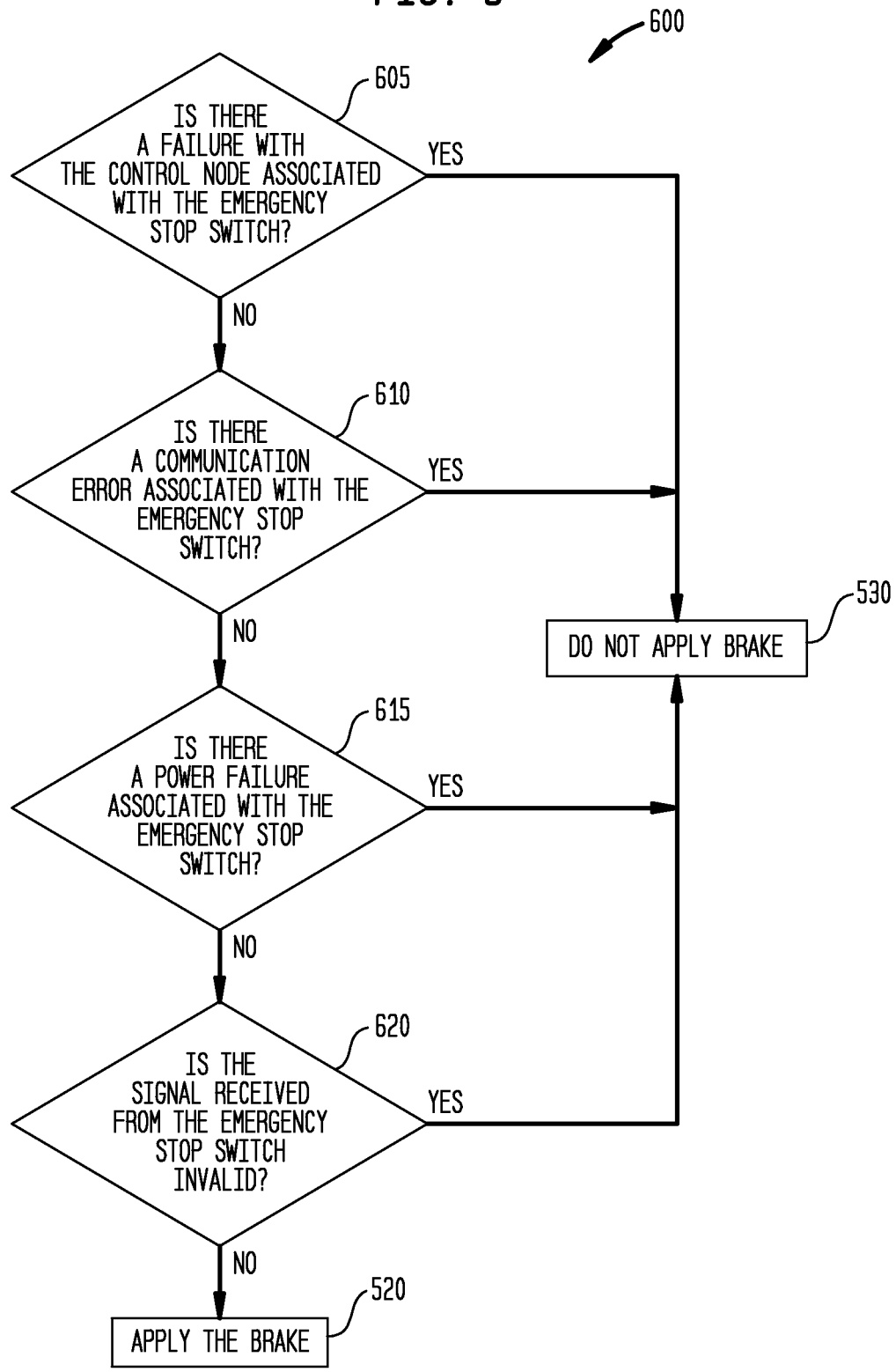

PROTECTION OF A BRAKE IN A WIND TURBINE

BACKGROUND

Field of the Invention

Embodiments presented in this disclosure generally relate to protecting a mechanical brake of a wind turbine, and more specifically, ensuring the mechanical brake is applied when there are no errors associated with applying the brake.

Description of the Related Art

Generally, when certain errors occur during operation of a wind turbine, the wind turbine goes into a failsafe mode. The failsafe mode is designed to protect the wind turbine from damage, as well as protect personnel servicing the wind turbine. Out of an abundance of caution, the failsafe mode applies a brake to stop the rotation of the rotor. However, because applying the brake may damage to the wind turbine, the brake should only be applied in an emergency situation when personnel are present. Put differently, current failsafe modes of operation apply the brake even when personnel are not present in the wind turbine which can cause unnecessary damage to the turbine.

SUMMARY

One embodiment of the present disclosure is a method for validating an emergency stop signal within a wind turbine. The wind turbine comprises a plurality of control nodes distributed throughout the wind turbine. The method comprises receiving an emergency stop signal from a first control node of the plurality of control nodes. The emergency stop signal indicates that the wind turbine should be shut down. The method also comprises shutting down the wind turbine by transmitting a shutdown signal to the plurality of control nodes. The method further comprises, upon determining there is no indication a person is present within the wind turbine, validating the emergency stop signal. Additionally, the method comprises, upon determining the emergency stop signal is valid, activating a brake to bring the rotor to a stop.

Another embodiment of the present disclosure is a wind turbine generator that has a rotor comprising a plurality of blades, a brake, and a plurality of control nodes distributed throughout the wind turbine. A control node of the plurality of control nodes is configured to receive an emergency stop signal from an emergency stop switch. The emergency stop signal indicates the wind turbine should be shut down. The control node is also configured to shut down the wind turbine by transmitting a shutdown signal to the plurality of control nodes. The control node is further configured to, upon determining there is no indication a person is present within the wind turbine, validate the emergency stop signal. Additionally, the control node is configured to, upon determining the emergency stop signal is valid, activate a brake to bring the rotor to a stop.

Another embodiment of the present disclosure is a computer-readable storage medium. The computer-readable storage medium has computer-readable program code. The computer-readable program code is executable by one or more computer processors to perform an operation. The operation comprises receiving an emergency stop signal from a first control node of the plurality of control nodes. The emergency stop signal indicates the wind turbine should be shut down. The operation also comprises shutting down the wind turbine by transmitting a shutdown signal to the plurality of control nodes. The operation further comprises, upon determining there is no indication a person is present within the wind turbine, validating the emergency stop signal. Additionally, the operation comprises, upon determining the emergency stop signal is valid, activating a brake to bring the rotor to a stop.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is a method for activating a mechanical brake, according to one embodiment described herein.

FIG. 6 is a method for validating an emergency signal, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Embodiments herein describe activating an emergency stop for a wind turbine. A wind turbine can include safety control nodes within a distributed architecture of control nodes. The safety control nodes may initiate a failsafe mode for operating the wind turbine if there is an error such as one of the control nodes losing power or a communication failure between the safety control nodes. The failsafe mode is designed such that in the event of failure or error within the wind turbine, the wind turbine shuts down in order to minimize damage to the wind turbine and ensure the safety of any personnel in the wind turbine. In the embodiments herein, if the failsafe mode is activated when personnel are not present within the wind turbine (e.g., there is a communication error or a loss of power in contrast to a human activating an emergency stop switch), the wind turbine does not apply a brake to the rotor as doing so is unnecessary because there is no immediate danger to personnel. In contrast, if personnel are present in the wind turbine when the failsafe mode is activated (e.g., an emergency stop switch is activated), in addition to shutting down, the wind turbine applies a brake to bring the rotor to a standstill in order to protect the personnel.

An advantage of the present disclosure is the brake is applied only when needed to ensure the safety of personnel at the wind turbine. Applying the brake may cause damage to various parts of the wind turbine, especially if personnel are not present to release the brake in the event the brake is activated unnecessarily. For example, the rotor may be damaged by stress caused by oscillating vibrations (induced by the wind) when the rotor is locked in a standstill for long periods of time. Further, the braking mechanism may be damaged or may cause a fire from overheating. Additionally, personnel may have to travel a long distance to where a wind turbine is located to release the brake, which increases the risk of damage to the brake since the brake is activated for an extended period of time. Thus, activating the brake when personnel are not present should be avoided to prevent any unnecessary damage to the wind turbine.

Example Embodiments

Figure 1:
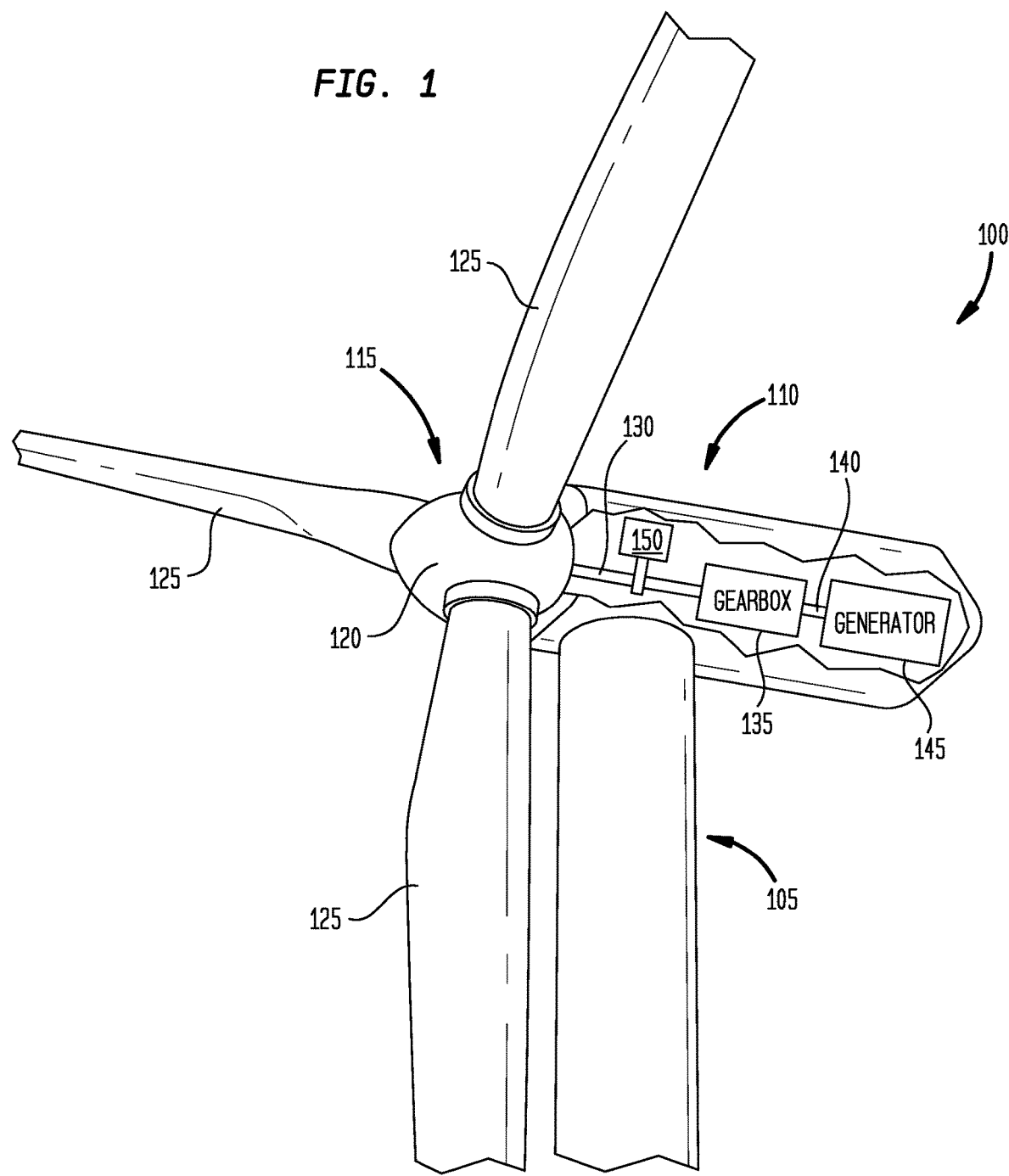
FIG. 1 illustrates a wind turbine generator, according to one embodiment described herein.

FIG. 1 illustrates a horizontal-axis wind turbine generator (WTG) 100. The WIG 100 has a tower 105 and a nacelle 110 located at the top of the tower 105. The WIG has a rotor 115 that includes rotor blades 125 mounted to a hub 120. While three rotor blades 125 are shown, any suitable number of blades, such as one, two, four, five, or more blades, may be used. In one embodiment, the blades 125 are connected to the hub 120 using pitch bearings such that each blade 125 may be rotated around its longitudinal axis to adjust the blade's pitch. The rotor 115 is mechanically coupled with the nacelle 110 via a drivetrain. A generator 145 is coupled to the drivetrain such that the generator 145 produces power from the rotation of the rotor 120. As shown, the drivetrain includes a shaft 130, a gearbox 135, and a second shaft 140. A braking system 150 that is capable of bringing the rotor 120 to a standstill is coupled to the shaft 130. While the braking system 150 is shown as coupled to the shaft 130, a person skilled in the art will appreciate the braking system 150 may be coupled to any part and/or location of the drivetrain. Further, a person skilled in the art will appreciate that the WIG 100 may include additional elements, which have been omitted for ease of explanation.

Figure 2:
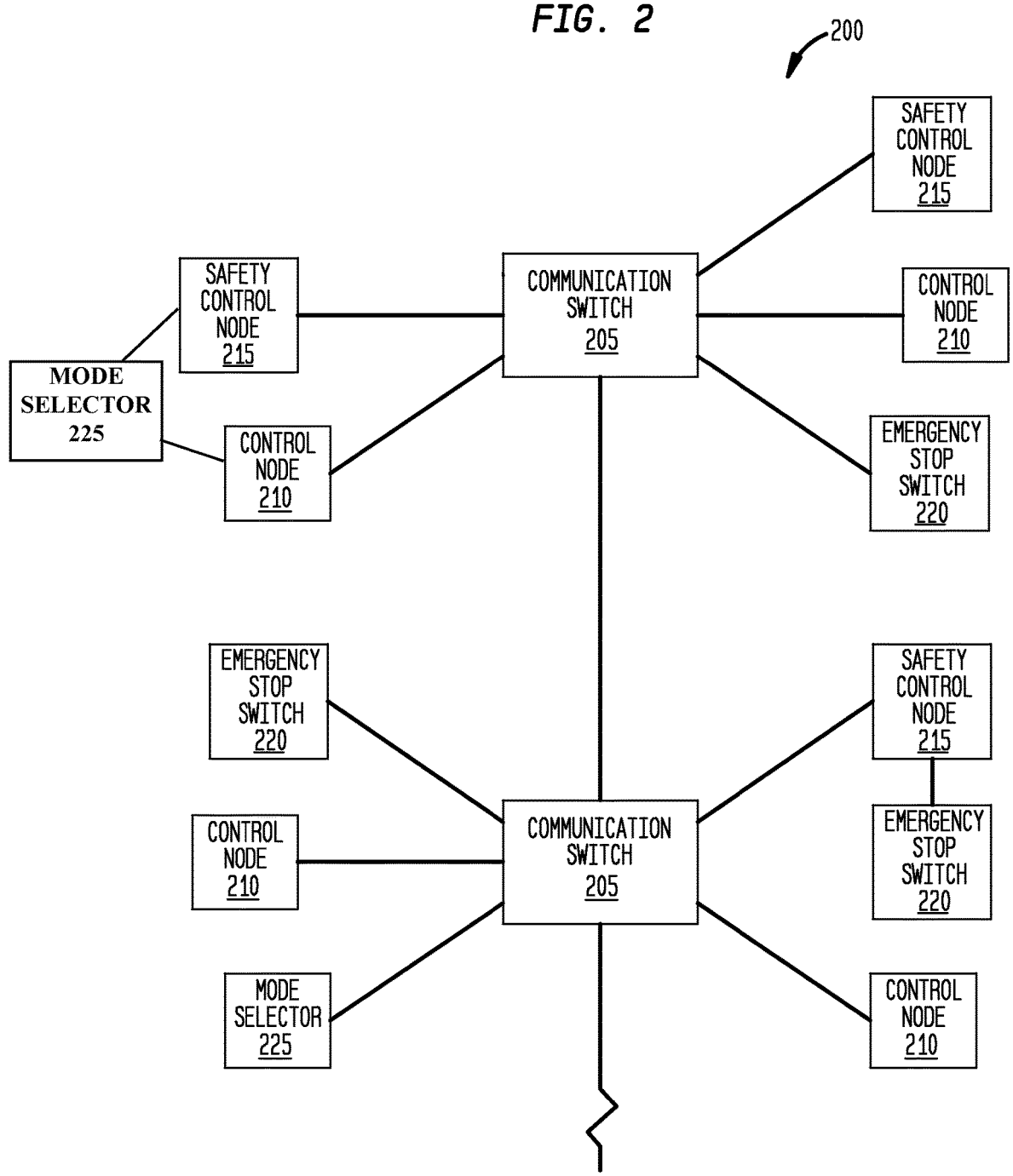
FIG. 2 illustrates a communication system within a wind turbine, according to one embodiment described herein.

FIG. 2 illustrates a communication system 200 within a wind turbine, according to one embodiment described herein. As shown, the communication system 200 is a distributed communication network having a plurality of communication switches 205. The communication switches 205 are coupled to a plurality of control nodes 210, safety control nodes 215, emergency stop switches 220, and mode selectors 225. While two communication switches 205 are shown for ease of explanation, a person skilled in the art would appreciate any number of communication switches 205 may be used. As shown in FIG. 2, the mode selectors 225 can be coupled to the safety control nodes 215, the control nodes 210, or directly to the communication switches 205. When coupled to both the safety control node 215 and the control node 210, the mode selector 225 may use a first number of communication channels (e.g., four) to communicate with the safety control node 215 and a second number of communication channels (e.g., four) to communicate with the control node 210. However, in another embodiment, the mode selector 225 may be coupled to only one of the control node 210 and the safety control node 215.

The communication system 200 is a distributed system based on safety functionality. In one embodiment, the communication system 200 is a real time communications network. The real time communications network may be a time triggered network which may dictate that all control nodes 210 and safety control nodes 215 communicate on the communication system 200 within specific time frames in order to ensure there are no errors with the communication network. In one embodiment, the communication system 200 is a Time Triggered Ethernet (TTE) network. In one embodiment, the communication system 200 is a replicated communication system with redundant communication switches such that if one of the communication switches 205 fails, the communication system 200 continues to operate normally.

In one embodiment, the control nodes 210 and safety control nodes 215 are distributed throughout the WTG 100. In one embodiment, the control nodes 210 and safety control nodes 215 comprise a processor, memory, and an I/O interface for communicating with the communication network 200. The control nodes 210 are configured to control various components of the WTG 100. For example, the control nodes 210 may control the pitching system of the rotor 120 or the braking system 150. The safety control nodes 215 are configured to handle emergency situations that arise within the WTG 100. In one embodiment, the safety control nodes 215 only handle emergency situations, while the control nodes 210 handle operation of the WTG 100. As will be appreciated by one skilled in the art, the control nodes 210 and the safety control nodes 215 may be any combination of software and hardware.

In one embodiment, the control nodes 210 and safety control nodes 215 validate data provided on the communication system 200. For example, each of the control nodes 210 receives data relating to operation of the WTG 100, and the control nodes 210 validate the received data before controlling operation of a component of the WTG 100. As another example, a safety control node 215 may receive data indicating an emergency is occurring within the WTG 100, and the safety control node 215 validates the received data before initiating an emergency protocol.

The communication system 200 includes a plurality of emergency stop switches 220 distributed throughout the WTG 100. The emergency stop switch 220 provides a signal to communication system 200 when the emergency stop switch 220 is activated, and the WTG 100 needs to shut down. In one embodiment, at least one of the safety control nodes 215 validates the signal sent by the emergency stop switch 220 as will be described in greater detail with reference to FIGS. 5 and 6. The emergency stop switch 220 may be directly coupled with a communication switch 205 and/or the communication network 200. Alternatively, the emergency stop switch 220 may be directly coupled with a safety control node 215. In one embodiment, a safety control node 215 is directly coupled with an emergency stop switch 220, and the safety control node validates the signal sent by the emergency stop switch 220.

A plurality of mode selectors 225 are coupled with the communication system 200. The mode selectors 225 have a plurality of modes that dictate which mode the WTG 100 operates in. In one embodiment, the mode selectors 225 have at least two operation modes: normal operation and service operation. In normal operation mode, the WTG 100 is shutdown but the rotor does not have to be at a standstill. Thus, in normal operation, if an emergency stop is triggered, the WTG 100 shuts down but does not apply the brake to stop the rotor. For example, the controller may pitch out the blades but still permit the rotor to rotate freely. The service operation mode, in contrast, applies the brake to the rotor to bring the rotor to a standstill in addition to shutting down the WTG 100. In one embodiment, shutting down the wind turbine includes stopping power production of the generator, pitching the blades out of the wind (e.g., feathering the blades out of the wind, positioning the blades such that the wind has a minimal impact on the rotation of the blades, etc.), and stopping operation of the WTG 100 (e.g., stopping power generation).

In one embodiment, the mode selectors 225 indicate whether a person is present within the WTG 100. For example, when a person enters the WTG 100 to perform maintenance, the person selects the service operation mode of at least one of the mode selectors 225. Upon selection of the service operation mode, the mode selector 225 informs the control nodes 210 and safety control nodes 215 that the mode of operation for the WTG 110 has changed to indicate that a person is present within the WTG 100. In response to the change in operation mode, the control nodes 210 and safety nodes 215 recognize that the failsafe mode should now include activating the brake to protect the personnel within the WTG 100. While a mode selector 225 is used as an example to indicate a person is present within the WTG 100, a person skilled in the art would appreciate there are additional methods for indicating a person is present in or around a wind turbine. For example, pressure mats may be placed at entrances to the WTG 100 to indicate when a person has stepped on them and is within or near the WTG 100. As another example, optical sensors may be used that indicate when a person has entered the WTG 100, such as a light curtain that detects when a person passes through the light curtain, or is near the WTG 100, such as a motion detector mounted externally or internally in the WTG 100. As a further example, personnel may wear RFID sensors that communicate with RFID transceivers distributed throughout the WTG 100 to indicate the location of personnel around the wind turbine. Thus, any device which indicates that a person is within or near the WTG 100 can be used.

Figure 3:
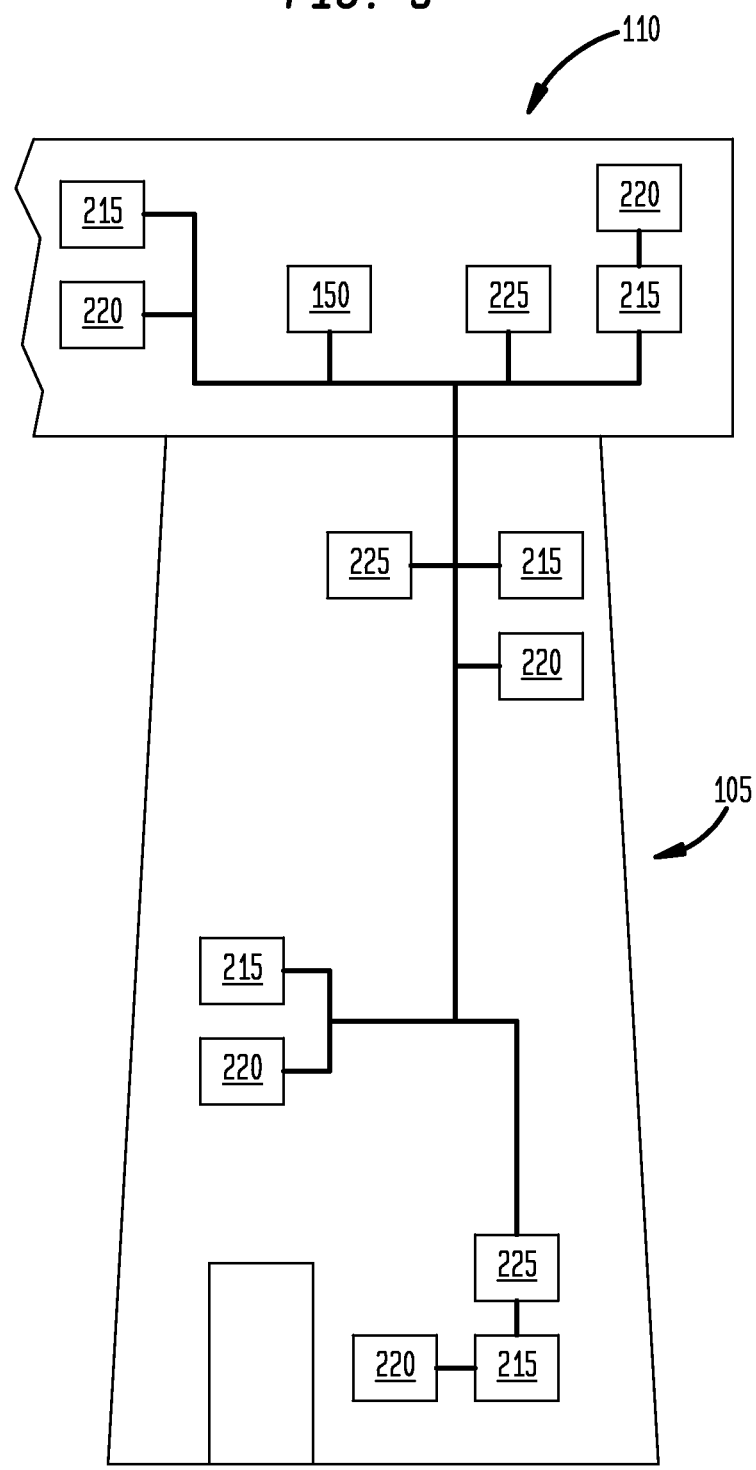
FIG. 3 is illustrates a communication system within a wind turbine, according to one embodiment described herein.

FIG. 3 illustrates a communication system within a wind turbine, according to one embodiment described herein. Specifically, FIG. 3 illustrates several exemplary locations of safety control nodes 215, emergency stop switches 220, and mode selectors 225 within the WTG 100 coupled together via the communication system 200. The braking system 150 is also coupled with the communication system such that the safety control nodes 215 can activate the brake system 150 as necessary. As shown in FIG. 3, the safety nodes 215, emergency stop switches 220, and mode selectors 225 are distributed within the tower 105 and the nacelle 110 of the WTG 100. In one embodiment, the emergency stop switches 220 and mode selectors 225 are located at any location within the WTG 100 a person would access so that a person can easily switch the operation mode of the WTG 110, as well as activate the emergency stop switches 220 if necessary. Some non-limiting examples include the base of the tower 105 near an entry way, the nacelle 110 near a roof access, the connector between the nacelle 110 and the tower 105, and so forth. As will be appreciated by one skilled in the art, there may be additional safety control nodes 215, emergency stop switches 220, and mode selectors 225 distributed throughout the WTG 100 (e.g., in the hub 120), and the invention should not be limited to embodiment shown in FIG. 3. Further, while not shown FIG. 3, a person skilled in the art would appreciate that the control nodes 210 are distributed throughout the WTG 100 as well.

Figure 4:
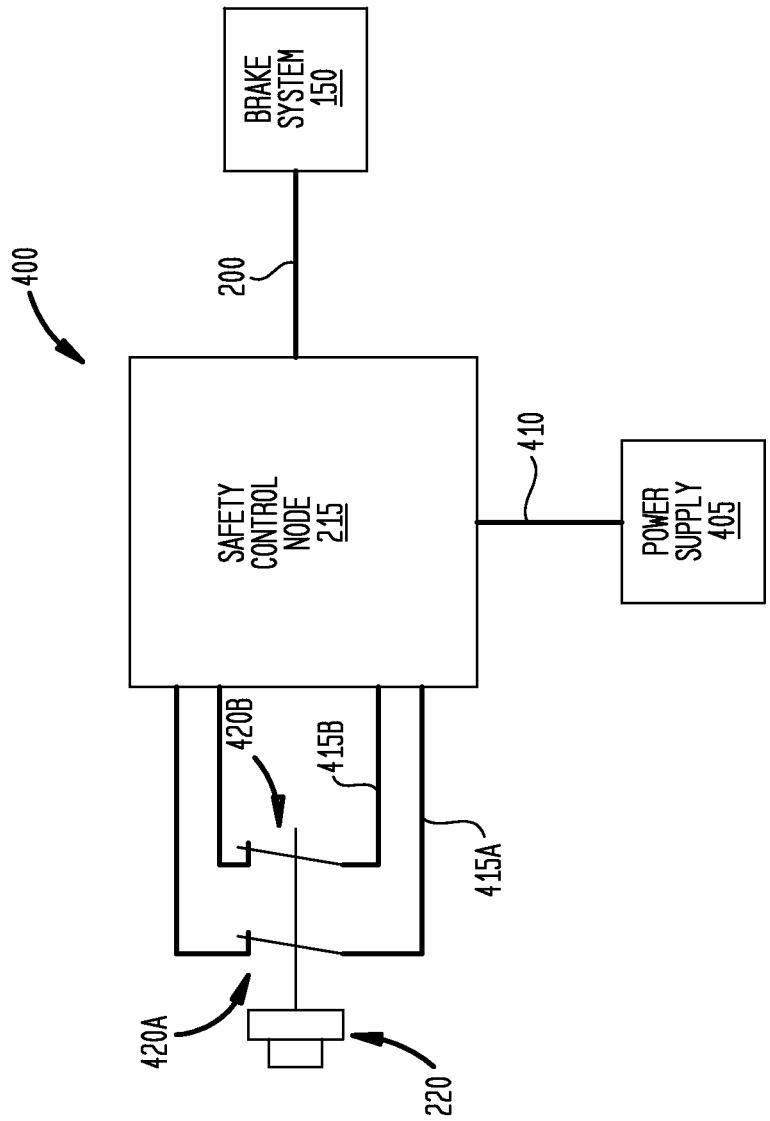
FIG. 4 illustrates an emergency stop system, according to one embodiment described herein.

FIG. 4 illustrates an emergency stop system 400, according to one embodiment described herein. The emergency stop switch 220 is coupled with a safety control node 215 via two connections 415A and 415B. The safety control node 215 is in turn coupled with the brake system 150 via the communication system 200. While the braking system 150 is shown as being separate from the safety control nodes 215, a person skilled in the art would appreciate the braking system 150 may include the functionality of the safety control nodes 215. That is, the safety control node 215 and the brake system 150 may be combined into a single system. In one embodiment, the safety control node 215 relays the emergency stop signal to the brake system 150 if there are no errors associated with the emergency stop signal. In turn, the brake system 150 activates the brake upon receiving the emergency stop signal to bring the WIG 100 to a standstill to ensure the safety of any personnel within the WIG 100. The safety control node 215 is coupled with a power supply 405 that provides power to the safety control node 215 via connection 410. As shown, the emergency stop switch 220 is coupled with two switches 420A and 420B that are a part of the connections 415A and 415B, respectively. When the emergency stop switch 220 is depressed, a signal is sent by the two switches 420A and 420B via the connections 415A and 415B to the safety control node 215. The emergency stop switch 220 is coupled with the two switches 420A and 420B to ensure there is no error when the signal is sent. For example, the switches 420A and 420B, when properly operating, may switch within a very small amount of time of each other. However, if one of the signals is not sent within the proper window, an error has occurred and the emergency signal may not be valid. Thus, the dual switches 420A and 420B allow for error detection to ensure the emergency stop switch 220 was actually activated by personnel in the wind turbine.

The safety control node 215 may detect additional errors associated with the emergency stop switch. The safety control node 215 may determine there is a crossover between the two connections 415A and 415B. That is, there is interference between the two connections 415A and 415B such that when one connection goes high, the other connection goes high even though the connection is supposed to be low. Additionally, the crossover may result in the voltage levels in the connections being slightly altered. For example, if the high value is supposed to be 5 V, crossover may occur that brings the high value down closer to 0 V, such as 4 V, which may result in the safety control node 215 not receiving a proper signal from the emergency stop switch 220.

As another example of an error associated with the emergency stop switch 220, there may be a short circuit at some point along the connections 415A and 415B. For example, the wires of the connections 415A and 415B may be damaged. The damage to the wires may cause a short to occur between the two connections 415A and 415B. Another example of an error is an overload within the connections 415A and 415B. For example, the power supply may provide too much power to the safety control node 215, which in turns causes the voltage on the connections 415A and 415B to be too high. Thus, the signal sent from the emergency stop switch 220 cannot be trusted as valid because the overload may have damaged the emergency stop switch 220 or the safety control node 215. Thus, the safety control node 215 may determine, due to the variations in the voltage, current, and/or signal, that a signal sent by the emergency stop switch 220 cannot be validated. Therefore, the safety control node 215 is capable of determining whether there is any error associated with the emergency stop switch 220 to prevent unnecessarily activating the braking system 150.

FIG. 5 illustrates a method 500 for activating a mechanical brake, according to one embodiment herein. FIGS. 5 and 6 will be described with reference to a control node 210 for ease of explanation. However, the control node 210 may be a control node 210 or a safety node 215. Thus, method 500 and method 600 should not be limited to only a control node 210. At block 505, a control node 210 receives an emergency stop signal that indicates the wind turbine needs to be shut down. As one example, personnel within the WTG 100 may activate an emergency stop in order to shut down the WTG 100 in the event of an emergency. Alternatively, the control node may receive an emergency stop signal, but there is no emergency within the WTG 100. For example, there may be a communication error between one of the emergency stop switches 220 and one of the control nodes 210 such that the control node 210 receives a signal indicating the emergency stop switch 220 was activated, when in fact the emergency stop switch 220 was not activated. As another example, a component of the wind turbine may lose power, and as a safety measure, the control node 210 sends an emergency stop signal indicating the wind turbine should be shut down. In one embodiment, a safety control 215 node receives the emergency stop signal directly from an emergency stop switch 220.

At block 510, the control node 210 shutdowns the wind turbine. In one embodiment, the control node 210 sends a shutdown signal to all of the components of the WTG 100 to initiate the shutdown sequence of the WTG 100. In one embodiment, shutting down the WTG 100 comprises feathering the blades, stopping power production of the generator, powering down the various components of the wind turbine, and allowing the rotor to rotate freely.

At block 515, the control node determines whether there is an indication a person is present within the wind turbine. In one embodiment, the mode selector 225 indicates a person is present within the WTG 100. For example, personnel may switch the mode selector 225 to a service operation mode, which indicates personnel are present within the WTG 100. In another embodiment, the presence of personnel can be detected using a sensor (e.g., optical sensor, pressure mat, RFID tag, etc.) within the WTG 100. If there is an indication a person is present within the wind turbine, the method continues to block 520 where the control node 210 sends a signal to the braking system 150, which causes the braking system 150 to activate the brake and bring the wind turbine to a standstill. If there is no indication a person is present within the wind turbine, the control node 210 proceeds to block 525.

At block 525, the control node determines whether the emergency stop signal is valid, which is described in detail in FIG. 6. If the emergency stop signal is valid, the control node instructs the braking system 150 to activate the brake and bring the wind turbine to a standstill. If the emergency stop signal is invalid, the control node 210 proceeds to block 530 and shuts down the WTG 100 without activating the brake—i.e., permits the rotor to rotate freely.

FIG. 6 illustrates a method 600 for validating an emergency signal, according to an exemplary embodiment described herein. Specifically, the method 600 is a more detailed description of block 525 of FIG. 5. At block 605, a control node 210 determines whether there is a failure with the control node associated with the emergency stop switch. If there is a failure in the control node associated with the emergency stop switch (e.g., a component within the control node fails), the control node 210 proceeds to block 530 and does not apply the brake. For example, the control node 210 may periodically perform a status check or health check of the components within the control node 210. If one of the components does not respond or responds with an error, the control node 210 recognizes that any signal sent may not be accurate due to the failed component. Thus, the control node 210 may provide a status signal to the communications system 200 indicating there is a failure within the control node 210. Therefore, the WTG 100 determines the emergency stop was a result of the failed control node 210 and not from personnel activating the emergency stop switch, and thus, stopping the rotator is not necessary. However, if there is not a failure in the control node associated with the emergency stop switch, the control node 210 proceeds to block 610.

At block 610, a control node determines whether there is a communication error associated with the emergency stop switch. For example, status information may be sent between the plurality of control nodes 210 at periodic intervals. If one of the control nodes does not respond or fails to respond on time this indicates there is a communication error associated with that respective control node. As another example, the data packet sent by a control node may not be decoded properly because the data is corrupted. If there is a communication error associated with the emergency stop switch, the control node 210 proceeds to block 530 and does not apply the brake. Thus, the control system determines the emergency stop was a result of the communication error and not from personnel activating the emergency stop switch, and thus, stopping the rotator is not necessary. However, if there is not a communication error associated with the emergency stop switch, the control node 210 proceeds to block 615.

At block 615, a control node determines whether there is a power failure associated with the emergency stop switch. For example, if total communication is lost with the emergency stop switch 220 or the control node associated with the emergency stop switch 220, the cause of the total communication loss may be a loss of power. If the mode selector 225 loses power, the WTG 100 may operate in the mode the mode selector 225 was last in. Thus, if the mode selector was in normal operation mode, and then loses power, the WTG 100 may continue to operate in normal operation mode (i.e., the WTG 100 would not apply the brake if an emergency stop signal is sent), rather than assume the worst case scenario that a person is present and the brake needs to be applied. If there is a power failure associated with the emergency stop switch, the control node 210 proceeds to block 530 and does not apply the brake. If there is not a power failure associated with the emergency stop switch, the control node 210 proceeds to block 620.

At block 620, a control node determines whether the signal received from the emergency stop switch is invalid. For example, there may be a hardware fault associated with the emergency stop switch 220 such that only one of the switches 420A and 420B (but not both) may have sent a signal to the safety control node 215, thereby indicating that one of the switches 420 malfunctioned, and thus, the emergency stop switch has outputted an invalid signal (i.e., the stop switch was not activated by personnel in the wind turbine). While a hardware fault is described with reference to the switches 420A and 420B, a person skilled in the art would appreciate there may be additional hardware faults associated with the emergency stop switch 220, such as hardware associated with a button of the emergency stop switch 220, a loss of power to the emergency stop switch 202, or any component within the emergency stop switch 220 that may fail. In another example, the safety control node 215 receiving the signal sent by the emergency stop switch 220 may be unable to decode the signal which indicates the signal is invalid. If the signal received from the emergency stop switch is invalid, the control node 210 proceeds to step 530 and does not apply the brake. That is, the control system determines that the emergency stop signal is a result of the emergency stop switch malfunctioning and not from personnel activating the emergency stop switch, and thus, stopping the rotator is not necessary. However, if the signal received from the emergency stop switch is valid, the control node 210 proceeds to block 520. At block 520, the control node 210 sends a signal to the braking system 150 which causes the braking system 150 to activate the brake and bring the wind turbine to a standstill. In this manner, the WTG 100 can validate the emergency stop signal to determine whether the braking system should be activated.

In the preceding, reference was made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A method of operating a wind turbine comprising a rotor and a brake configured to stop the rotor, the method comprising:
    receiving, from a first control node of a plurality of control nodes distributed throughout the wind turbine, an emergency stop signal; and
    responsive to the emergency stop signal:
        transmitting a shutdown signal to the plurality of control nodes;
        responsive to an absence of an indication that a person is present within the wind turbine, determining whether the emergency stop signal is valid; and activating the brake responsive to determining that the emergency stop signal is valid.

2. The method of claim 1,
wherein the first control node is a safety node configured to handle emergency situations within the wind turbine, and
wherein the wind turbine further comprises an emergency stop switch coupled with the safety node.

3. The method of claim 2,
wherein determining whether the emergency stop signal is valid comprises determining there is no error associated with the emergency stop signal,
wherein the error is at least one of a communication error associated with the safety node, a power failure within the wind turbine, and a hardware fault of the emergency stop switch.

4. The method of claim 2, wherein determining whether the emergency stop signal is valid comprises confirming a human operator activated the emergency stop switch.

5. The method of claim 1, wherein the indication that the person is present is received from at least one of:
a mode selector that dictates a mode of operation of the wind turbine,
an optical sensor that detects the presence of the person within the wind turbine,
a pressure mat,
a light curtain that detects when the person passes through the light curtain, and
an RFID transceiver.

6. The method of claim 1, further comprising:
feathering blades mounted to the rotor and allowing the rotor to rotate freely.

7. The method according to claim 1, further comprising:
restarting the wind turbine;
receiving a second emergency stop signal from a second control node of the plurality of control nodes; and
responsive to determining that the second emergency stop signal is invalid, shutting down the wind turbine without activating the brake.

8. A wind turbine generator comprising:
a rotor comprising a plurality of blades;
a brake configured to stop the rotor;
an emergency stop switch; and
a plurality of control nodes distributed throughout the wind turbine, wherein a first control node of the plurality of control nodes is configured to:
receive an emergency stop signal from the emergency stop switch;
responsive to the emergency stop signal:
transmitting a shutdown signal to the plurality of control nodes; responsive to an absence of an indication that a person is present within the wind turbine, determine whether the emergency stop signal is valid; and
activate the brake responsive to determining that the emergency stop signal is valid.

9. The wind turbine generator of claim 8,
wherein the first control node is a safety node coupled with the emergency stop switch, wherein the safety node is configured to handle emergency situations within the wind turbine.

10. The wind turbine generator of claim 9, wherein determining whether the emergency stop signal is valid comprises determining there is no error associated with the emergency stop signal, wherein the error is at least one of a communication error associated with the safety node, a power failure within the wind turbine, and a hardware fault of the emergency stop switch.

11. The wind turbine generator of claim 8, wherein determining whether the emergency stop signal is valid comprises confirming a human operator activated the emergency stop switch.

12. The wind turbine of claim 8, wherein the indication that the person is present is received from at least one of:
a mode selector that dictates a mode of operation of the wind turbine,
an optical sensor that detects the presence of the person within the wind turbine,
a pressure mat,
a light curtain that detects when a person passes through the light curtain, and
an RFID transceiver.

13. The wind turbine generator of claim 8, wherein the first control node is further configured to:
feathering the plurality of blades and allowing the rotor to rotate freely.

14. The wind turbine generator of claim 8, wherein the first control node is further configured to:
shut down the wind turbine without activating the brake responsive to determining that the emergency stop signal is not valid.

15. A non-transitory computer-readable storage medium having computer-readable program code embodied therewith, the computer-readable program code executable by one or more computer processors to perform an operation, wherein the operation comprises:
receiving, from a first control node of a plurality of control nodes distributed throughout a wind turbine, an emergency stop signal;
responsive to the emergency stop signal:
transmitting a shutdown signal to the plurality of control nodes;
responsive to an absence of an indication that a person is present within the wind turbine, determining whether the emergency stop signal is valid; and
activating a brake of the wind turbine responsive to determining the emergency stop signal is valid, wherein activating the brake brings a rotor of the wind turbine to a stop.

16. The method of claim 1, wherein the indication that the person is present is a mode selector indicating that the wind turbine is operating in a service operation mode.

17. The method of claim 1, wherein the indication that the person is present is an RFID transceiver in communication with an RFID sensor wearable by the person.

18. The wind turbine generator of claim 8, wherein the first control node is further configured to:
responsive to a presence of the indication that the person is present, activate the brake without determining whether the emergency stop is valid.

* * * * *